No. 835,111. PATENTED NOV. 6, 1906.
W. NICHOLSON, Jr.
TAPPING APPARATUS.
APPLICATION FILED DEC. 22, 1905.
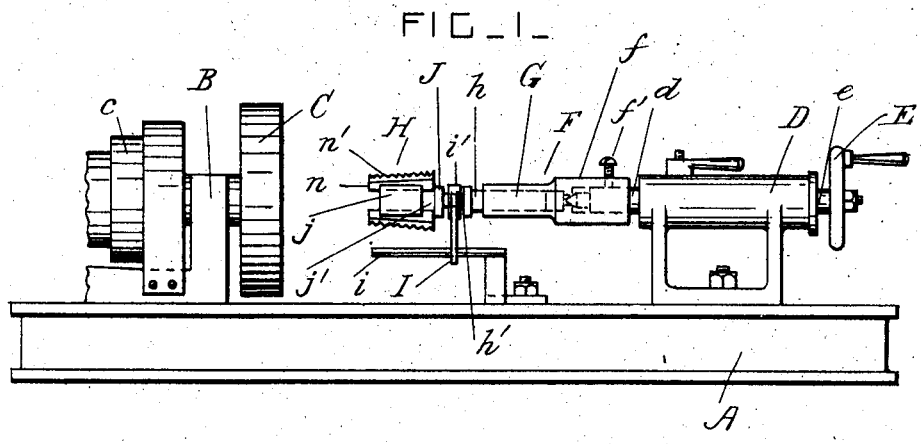
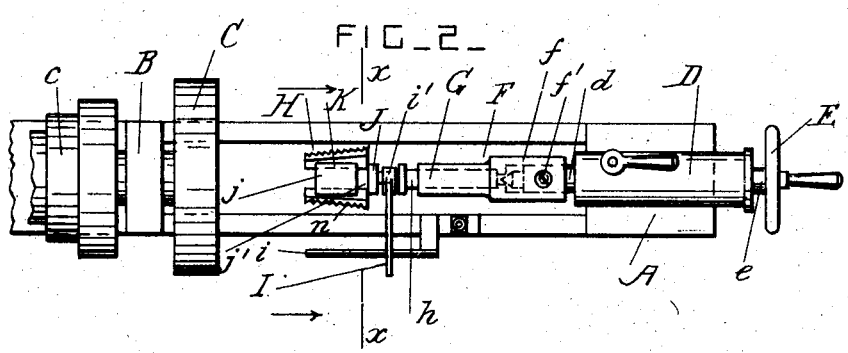
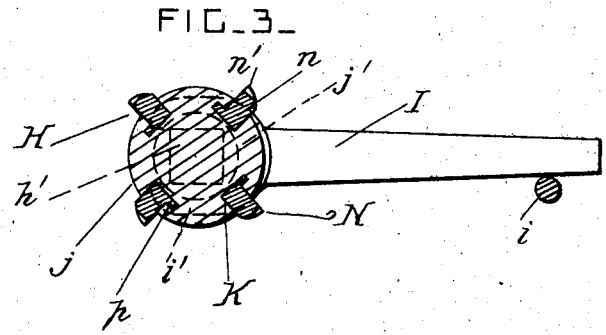
WITNESSES:
INVENTOR
William Nicholson, Jr.
BY Herbert W. T. Jenner.
Attorney

UNITED STATES PATENT OFFICE.

WILLIAM NICHOLSON, JR., OF WILKES-BARRE, PENNSYLVANIA, ASSIGNOR TO WM. H. NICHOLSON & CO., OF WILKES-BARRE, PENNSYLVANIA, A FIRM.

TAPPING APPARATUS.

No. 835,111.      Specification of Letters Patent.      Patented Nov. 6, 1906.

Application filed December 22, 1905. Serial No. 293,015.

*To all whom it may concern:*

Be it known that I, WILLIAM NICHOLSON, Jr., a citizen of the United States, residing at Wilkes-Barre, in the county of Luzerne and State of Pennsylvania, have invented certain new and useful Improvements in Tapping Apparatus; and I do hereby declare the following to be a full, clear, and exact description of the invention, such as will enable others skilled in the art to which it appertains to make and use the same.

This invention relates to mechanism for tapping screw-threaded holes in metal blocks; and it consists in the novel construction and combination of the parts hereinafter fully described and claimed.

In the drawings, Figure 1 is a front view of the tapping mechanism. Fig. 2 is a plan view of the same. Fig. 3 is a cross-section taken on the line $x\ x$ in Fig. 2.

A is a bed, and B is a head-stock secured to the bed.

C is a face-plate or other similar work-holder, which is journaled in the head-stock and provided with a pulley $c$ or other approved driving mechanism for revolving it.

D is a foot-stock which is secured to the bed and provided with a spindle $d$.

E is a hand-wheel, and $e$ is a screw for moving the said spindle longitudinally, and the said spindle is arranged axially in line with the face-plate.

All the above-mentioned parts may be the corresponding parts of any approved engine-lathe, boring-machine, or other similar machine-tool.

F is a tap-holder provided with a socket $f$, which is slid over the projecting end portion of the spindle $d$. A small screw $f'$ is provided for holding the socket on the spindle and preventing it from being displaced accidentally; but this screw may be dispensed with. The tap-holder is provided with a guide G at its front end, which is arranged axially in line with the spindle.

H is a tap which is provided with a shank $h$, which is slidable longitudinally in the guide G. This shank is provided with an arm I, which projects laterally from it and which rests on a guide $i$ on the bed. This arm is preferably removable, and it is provided at one end with a jaw $i'$, which engages with a rectangular portion $h'$ on the shank of the tap.

When an engine-lathe is used in carrying out this invention, the guide $i$ may conveniently be a bar secured horizontally in the tool-carriage. The tap is provided with an abutment-disk J and a cylindrical front end portion $j$. A groove $j'$ is formed between the said cylindrical portion and disk, and K represents longitudinal grooves formed in the said cylindrical portion, level with the bottom of the said groove.

The tap is provided with a series of tapping-blades $n$, provided with portions of screw-threads $n'$ on their outer surfaces. N represents the cuttingedges of the blades, and $p$ represents projections on the blades arranged on the same side as the cutting edges. These projections fit in undercut grooves in the cylindrical portion $j$ of the tap. The tapping-blades are made to fit tightly in their retaining-grooves, and their rear ends bear against the abutment-disk. The blades are preferably tapered, and the projections $p$ prevent them from tipping in their retaining-grooves. As many cutting-blades as desired can be used, and large taps of twelve or more inches in diameter can be made to work successfully when constructed in this manner.

The work, such as a block or plate of metal, is secured to the work-holder, a hole of suitable size being first formed in it. The front end of the tap is fed gradually into the hole in the work by means of the feed-screw and hand-wheel, and the work is revolved. The tap is prevented from revolving by means of the arm I, and it feeds itself automatically into the hole in the work, tapping the said hole as it is moved forward. The spindle is held stationary after the tap has been moved forward by it into engagement with the hole, and the shank of the tap then slides longitudinally in its guide while the hole is being tapped.

When this apparatus is used, it is not necessary to chase any screw-threads in the hole with a chasing or cutting tool before using the tap and the tapping of the hole is completed in a single operation.

What I claim is—

1. In tapping mechanism, the combination, with a tap-holder provided at one end with a socket for engaging with a supporting-spindle and having a guide-socket at its other end, of a tap having an integrally-formed shank which is slidable in the said guide-socket, a stationary guide secured parallel with the axis of the said tap and tap-holder, and an arm which projects from the said tap and slides longitudinally on the said guide.

2. In tapping mechanism, the combination, with a tap-holder provided at one end with a socket for engaging with a supporting-spindle and having a guide at its other end, of a tap provided with a shank which is slidable in the said guide, said shank having a rectangular portion at its middle part, and a removable arm for preventing the said tap from revolving provided with a jaw for engaging with the said rectangular portion.

In testimony whereof I have affixed my signature in the presence of two witnesses.

WILLIAM NICHOLSON, Jr.

Witnesses:
A. L. TURNER,
HARRY S. NICHOLSON.